United States Patent
Nakajima et al.

(10) Patent No.: US 7,192,665 B2
(45) Date of Patent: Mar. 20, 2007

(54) REGULATOR FOR FUEL CELL

(75) Inventors: Yoji Nakajima, Kakuda (JP); Kazuki Ishikawa, Kakuda (JP); Takashi Yoshida, Kakuda (JP); Katsumi Sahoda, Utsunomiya (JP); Kouji Miyano, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 646 days.

(21) Appl. No.: 10/725,790

(22) Filed: Dec. 1, 2003

(65) Prior Publication Data
US 2006/0127722 A1    Jun. 15, 2006

(30) Foreign Application Priority Data
Nov. 29, 2002 (JP) .............................. 2002-348921

(51) Int. Cl.
G05D 16/02 (2006.01)
H01M 8/04 (2006.01)

(52) U.S. Cl. ............... 429/22; 123/463; 137/87.06; 137/484.8; 137/505.14; 137/505.18; 137/505.37; 429/25

(58) Field of Classification Search ......... 137/87.06, 137/484.8, 505.14, 505.18, 505.37; 429/22, 429/25
See application file for complete search history.

(56) References Cited

U.S. PATENT DOCUMENTS

| | | | | |
|---|---|---|---|---|
| 1,539,630 A | * | 5/1925 | Beaird ............... | 137/87.06 |
| 1,955,037 A | * | 4/1934 | Viel .................. | 123/463 |
| 2,806,481 A | * | 9/1957 | Faust ................ | 137/484.8 |
| 4,228,777 A | * | 10/1980 | Haase ............... | 123/454 |
| 4,543,935 A | * | 10/1985 | Tuckey ............. | 123/463 |
| 5,785,023 A | * | 7/1998 | Cross ............... | 123/463 |
| 6,155,290 A | | 12/2000 | Nakajima et al. | |
| 2002/0022171 A1 | | 2/2002 | Saito et al. | |
| 2002/0142197 A1 | | 10/2002 | Kato et al. | |

FOREIGN PATENT DOCUMENTS

| | | |
|---|---|---|
| JP | 11-270717 | 10/1999 |
| JP | 2001-176526 | 6/2001 |
| JP | 2001-266922 | 9/2001 |
| JP | 2002-093438 | 3/2002 |
| JP | 2002-182751 | 6/2002 |
| JP | 2002-289232 | 10/2002 |
| JP | 2002-313382 | 10/2002 |
| JP | 2002-313387 | 10/2002 |

* cited by examiner

Primary Examiner—Stephen M. Hepperle
(74) Attorney, Agent, or Firm—Lahive & Cockfield, LLP; Anthony A. Laurentano, Esq.

(57) ABSTRACT

A regulator for use with fuel cells, which is mounted in a pressure controller of a fuel cell system, has a first diaphragm flexible under the pressure of pilot air supplied as an oxidizing agent to a pilot chamber, a second diaphragm flexible under the pressure of a hydrogen-containing gas flowing through a fluid passage, and a rod connected to a valve head. The spring force of a first spring is set to a value greater than the spring force of a second spring. The regulator is of a normally closed type in which the valve head is seated on a valve seat when the pilot air is not supplied to the pilot chamber.

20 Claims, 4 Drawing Sheets

PRESSURE VS. FLOW RATE CHARACTERISTICS

REGULATOR FOR FUEL CELL

BACKGROUND OF THE INVENTION

1. Field of the Invention

The present invention relates to a regulator for use with a fuel cell for supplying an anode of a fuel cell stack with a fuel (hydrogen) as a reactant gas under a pressure depending on the pressure of an oxidizing agent (air) which is given as a signal pressure.

2. Description of the Related Art

Heretofore, solid polymer membrane fuel cell have a stack of cells (hereinafter referred to as a fuel cell stack) each comprising an anode and a cathode and a solid polymer electrolyte membrane interposed between the anode and the cathode. When hydrogen is supplied as a fuel to the anode and air is supplied as an oxidizing agent to the cathode, hydrogen ions are generated at the anode by a catalytic reaction. The hydrogen ions move through the solid polymer electrolyte membrane to the cathode. Electric power is generated in the fuel cell by the electrochemical reaction.

The fuel cell system includes an air compressor for supplying air as a reactant gas to the cathodes of the fuel cell stack and a pressure control valve for supplying hydrogen as a reactant gas to the anodes of the fuel cell stack under a pressure depending on the pressure of air which is given as a signal pressure. The pressure of the reactant gas supplied to the anodes with respect to the pressure of the reactant gas supplied to the cathodes is adjusted to a predetermined pressure for thereby achieving a predetermined power generation efficiency, and the flow rate of the reactant gas supplied to the fuel cell stack is controlled to obtain a desired fuel cell output.

The applicant of the present application has proposed a gas pressure reducing valve for use in a fuel gas supply device, as disclosed in Japanese laid-open patent publication No. 2002-182751 and Japanese laid-open patent publication No. 11-270717.

SUMMARY OF THE INVENTION

It is a general object of the present invention to provide a regulator suitable for use with fuel cells.

A major object of the present invention is to provide a regulator for use with fuel cells which is not required to deliver a fuel gas from a secondary port when unnecessary, thereby preventing the fuel gas from being wasted and saving power, unlike a normally open regulator.

Another object of the present invention is to provide a regulator for use with fuel cells which is capable of preventing air and a fuel gas from being mixed with each other.

Still another object of the present invention is to provide a regulator for use with fuel cells which is capable of regulating the pressure of a fuel gas delivered from a secondary port to a pressure that is two to four times the pressure of an air serving as a pilot pressure, and of being applied to various ejectors.

Yet another object of the present invention is to provide a regulator for use with fuel cells which is capable of regulating the pressure of a fuel gas delivered from a secondary port to a pressure that is three times the pressure of an air serving as a pilot pressure.

Yet still another object of the present invention is to provide a regulator for use with fuel cells in which a fluid is supplied to the regulator at a constant pressure, and the regulator is capable of reducing a pressure change at the time the flow rate of the fluid supplied to a secondary port is increased, thus providing desirable pressure vs. flow rate characteristics.

A further object of the present invention is to provide a regulator for use with fuel cells which is free of abrupt cross-sectional area changes and is capable of suppressing self-excited oscillations.

A still further object of the present invention is to provide a regulator for use with fuel cells which is capable of preventing a valve head from being inclined on a valve seat.

A yet further object of the present invention is to provide a regulator for use with fuel cells which is capable of achieving good slidability in a sliding region of an outer circumferential surface of a guide member and a guide sleeve.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
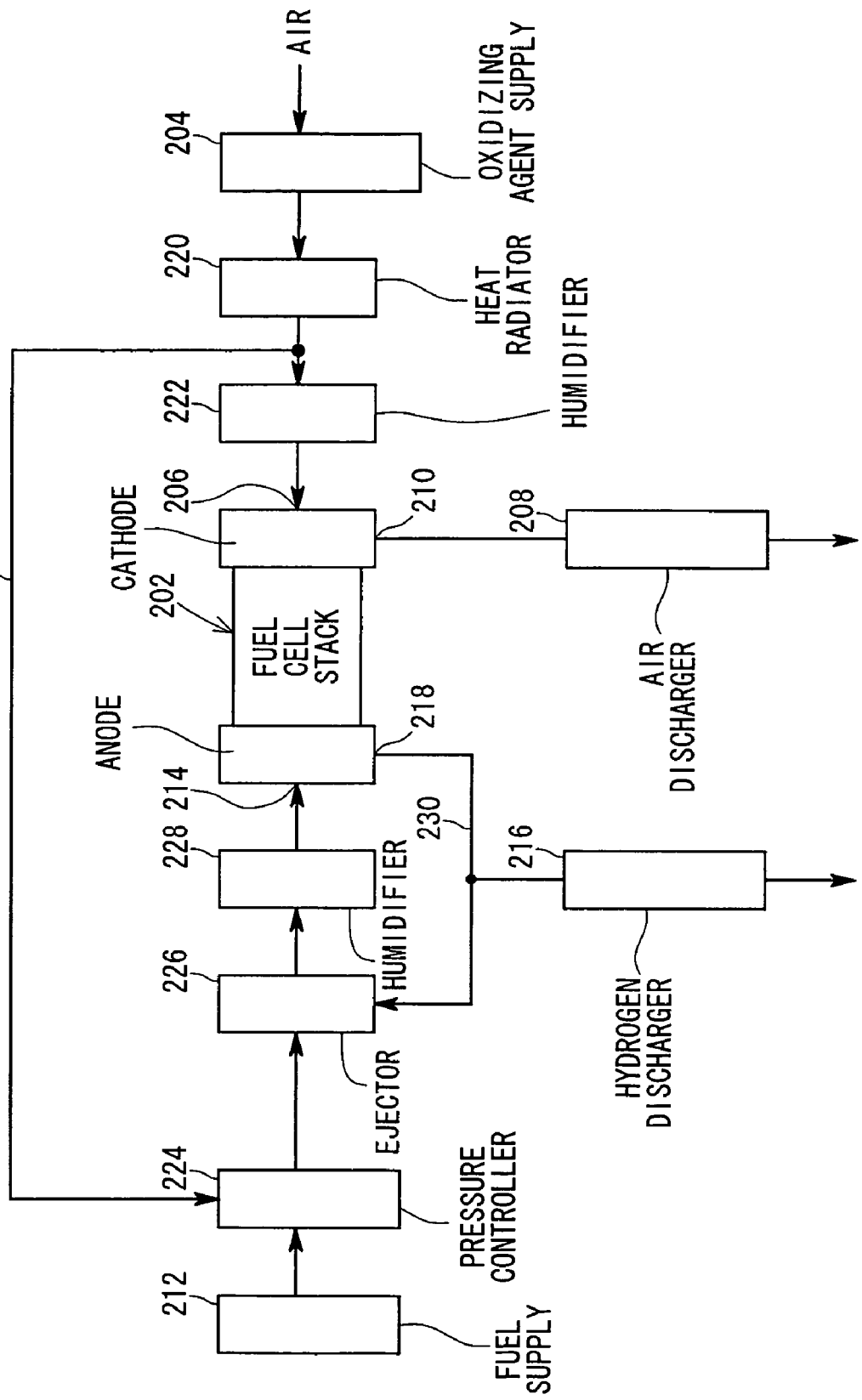
FIG. 1 is a block diagram of a fuel cell system which incorporates a regulator for fuel cells according to an embodiment of the present invention.

FIG. 1 is a block diagram of a fuel cell system 200 which incorporates a regulator for fuel cells according to an embodiment of the present invention. The fuel cell system 200 is mounted on a vehicle such as an automobile or the like.

The fuel cell system 200 includes a fuel cell stack 202 having a stack of cells each comprising an anode, a cathode, and a solid polymer electrolyte membrane such as a solid polymer ion exchange membrane interposed between the anode and the cathode. The fuel cell stack 202 has an anode supplied with a gas mainly containing hydrogen (hereinafter referred to as "hydrogen") as a fuel gas (hereinafter referred to as "fuel" if necessary) and a cathode supplied with air containing oxygen, for example, as an oxidizing agent.

Air is supplied from an oxidizing agent supply 204 to the cathode of through an air supply port 206. An air discharge port 210 is connected to an air discharger 208 for discharging air in the cathode. A hydrogen is supplied from a fuel supply 212 to the anode through a hydrogen supply port 214. A hydrogen discharge port 218 is connected to a hydrogen discharger 216.

The fuel cell stack 202 is arranged such that hydrogen ions generated at the anode by a catalytic reaction move through the solid polymer electrolyte membrane to the cathode where they cause an electrochemical reaction with oxygen to generate electric power.

To the air supply port 206, there are connected the oxidizing agent supply 204, a heat radiator 220, and a cathode humidifier 222 by an air supply passage. The air discharger 208 is connected to the air discharge port 210 by an air discharge passage.

To the hydrogen supply port 214, there are connected the fuel supply 212, a pressure controller 224, an ejector 226, and an anode humidifier 228 by a hydrogen supply passage. The hydrogen discharger 216 is connected to the hydrogen discharge port 218 by a circulation passage 230.

The oxidizing agent supply 204 comprises, for example, a supercharger (compressor) and a motor for actuating the supercharger (not shown). The oxidizing agent supply 204 adiabatically compresses air, which is to be used as an oxidizing gas in the fuel cell stack 202, and supplies the compressed air to the fuel cell stack 202. When the air is adiabatically compressed, it is heated. The heated air that is supplied to the fuel cell stack 202 is effective to warm the fuel cell stack 202.

The air supplied from the oxidizing agent supply 204 is set to a certain pressure depending on the load on the fuel cell stack 202 or the amount of depression of an accelerator pedal (not shown), for example, before it is introduced into the fuel cell stack 202. After the air is cooled by the heat radiator 220, to be described below, it is supplied as a pilot pressure through a bypass passage 232 to the pressure controller 224.

The heat radiator 220 comprises an intercooler or the like (not shown), for example, and cools the air supplied from the oxidizing agent supply 204 during normal operation of the fuel cell stack 202 through a heat exchange with cooling water which flows through a flow passage. Therefore, the supplied air is cooled to a predetermined temperature and then introduced into the cathode humidifier 222.

The cathode humidifier 222 has a water-permeable membrane, for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to keep the ion conductivity of the solid polymer electrolyte membranes of the fuel cell stack 202 in a predetermined state.

The air discharger 208 connected to the air discharge port 210 of the fuel cell stack 202 has a discharge valve (not shown) which discharges the air into the atmosphere.

The fuel supply 212 comprises a hydrogen gas container (not shown) for supplying hydrogen as a fuel to the fuel cells, for example. The fuel supply 212 stores hydrogen that is to be supplied to the anode of the fuel cell stack 202.

The pressure controller 224 incorporates a regulator 10 for fuel cells, to be described later, therein. The pressure controller 224 sets a secondary pressure that is the pressure from the outlet of the pressure controller 224 to a pressure within a predetermined range, using the pressure of the air supplied through the bypass passage 232 as a pilot pressure (pilot signal pressure). For example, the pressure controller 224 sets the ratio of the pilot signal pressure to the secondary pressure to a value in the range from about 1:2 to about 1:4. Therefore, the secondary pressure is set in the range from about 2 to about 4 with respect to the pilot signal pressure set to 1. This ratio range is effective to keep desired circulation pressure and suction characteristics and maximize the performance of the ejector 226 in various experiments conducted on the ejector 226 as described later. Particularly, the ratio of the pilot signal pressure to the secondary pressure is set to 1: about 3 in the ejector 226 according to the present embodiment.

The ejector 226 comprises a nozzle and a diffuser (not shown). The fuel (hydrogen) supplied from the pressure controller 224 is accelerated when it passes through the nozzle, and ejected toward the diffuser. When the fuel flows at a high speed from the nozzle to the diffuser, a negative pressure is developed in an auxiliary chamber disposed between the nozzle and the diffuser, attracting the fuel discharged from the anode through the circulation passage 230. The fuel and the discharged fuel that are mixed together by the ejector 226 are supplied to the anode humidifier 228. The fuel discharged from the fuel cell stack 202 circulates through the ejector 226.

Therefore, the unreacted gas discharged from the hydrogen discharge port 218 of the fuel cell stack 202 is introduced through the hydrogen passage 230 into the ejector 226. The hydrogen supplied from the pressure controller 224 and the gas discharged from the fuel cell stack 202 are mixed with each other and supplied to the fuel cell stack 202.

The anode humidifier 228 has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is supplied to the fuel cell stack 202 to keep the ion conductivity of the solid polymer electrolyte membranes of the fuel cell stack 202 in a predetermined state.

The hydrogen discharger 216, which has a discharge control valve, not shown, is connected to the hydrogen discharge port 218 of the fuel cell stack 202 by the circulation passage 230. The discharge control valve can be opened and closed depending on an operating state of the fuel cell stack 202 for discharging excessive water (mainly liquid water) in a discharged gas which has been separated by a reservoir tank, not shown.

Figure 2:
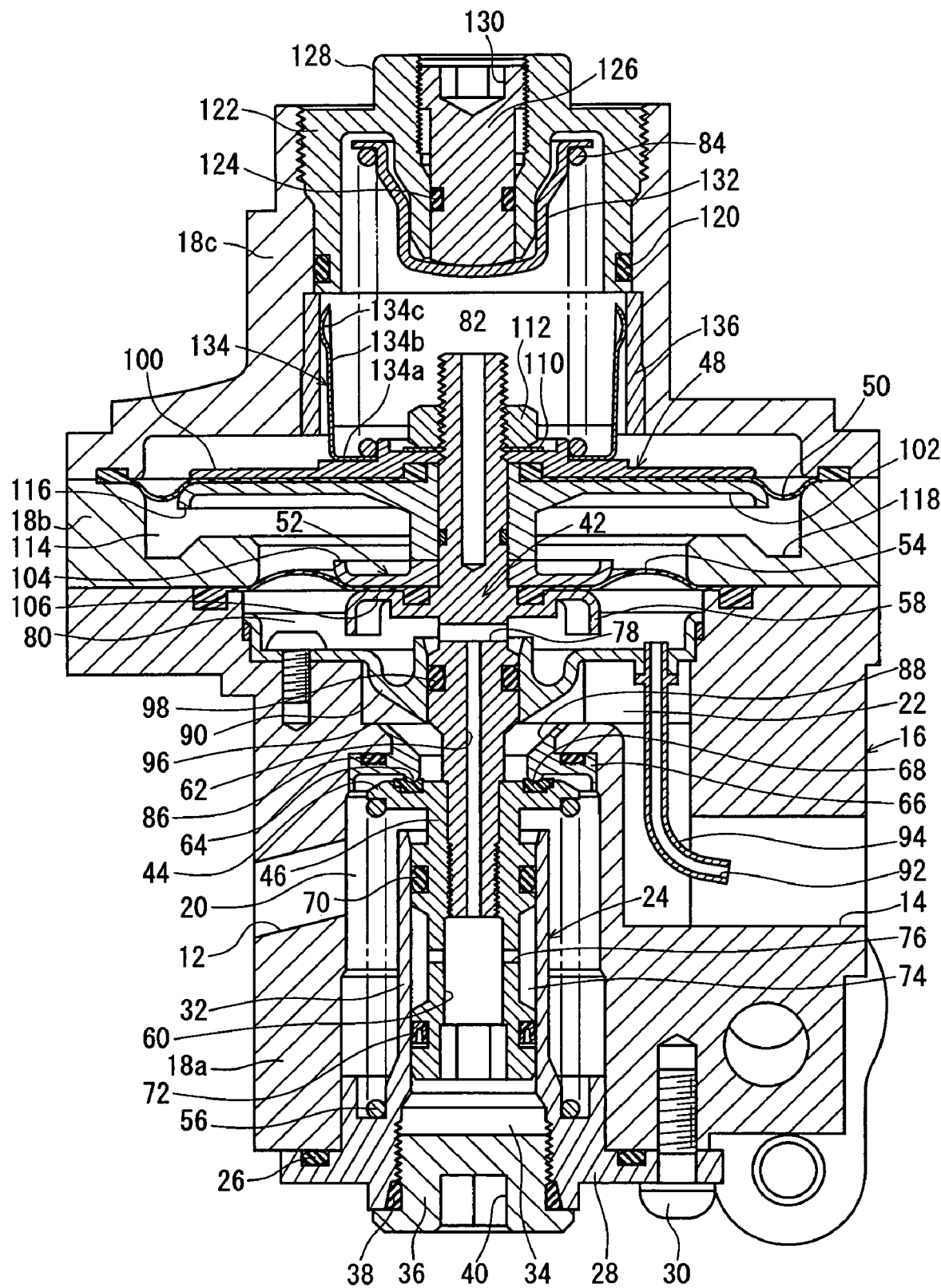
FIG. 2 is a vertical cross-sectional view of the regulator with a valve which is closed under normal conditions.
Figure 3:
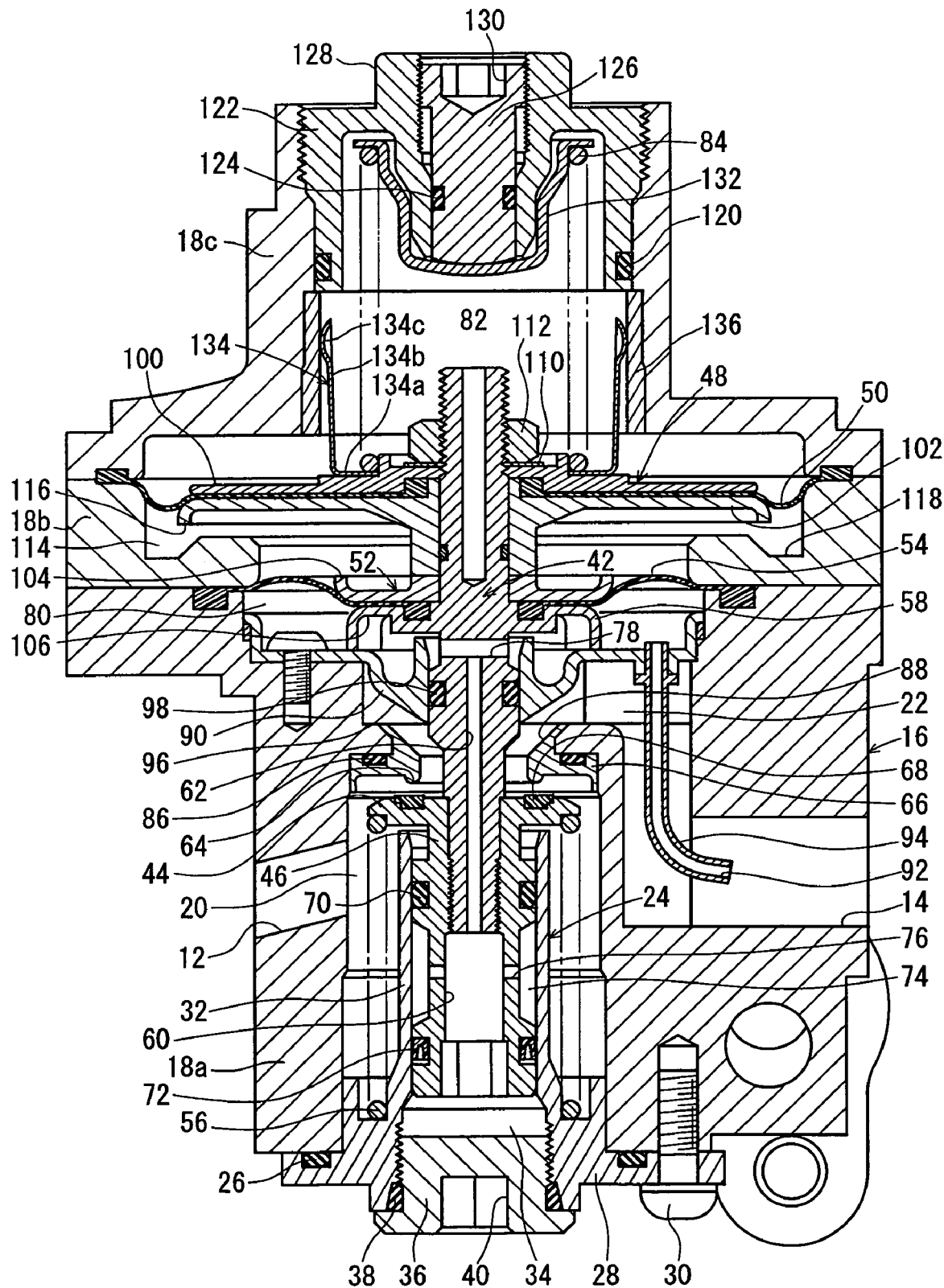
FIG. 3 is a vertical cross-sectional view of the regulator with the valve which is open when the regulator is supplied with a pilot pressure.

The regulator 10 for fuel cells according to the present embodiment, which is incorporated in the pressure controller 224 of the fuel cell system 200, is shown in FIGS. 2 and 3.

The regulator 10 includes a body 16 having a primary port 12 for introducing hydrogen supplied from the fuel supply 212 and a secondary port 14 for regulating the pressure of the hydrogen introduced from the primary port 12 to a predetermined pressure and delivering the pressure-regulated hydrogen to the ejector 226. The body 16 is made up of a first block 18a, a second block 18b, and a third block 18c that are stacked and integrally joined together. The body 16 has a space 20 defined therein which houses therein a valve mechanism 24 for selectively opening and closing a fluid passage 22 that provides fluid communication between the primary port 12 and the secondary port 14.

The first block 18a has a hole defined in the bottom thereof, and a valve head guide member 28 is received in the hole and joined to the first block 18a by a bolt 30 with an O-ring 26 interposed therebetween. The valve head guide member 28 has an integral cylindrical guide sleeve 32 projecting a predetermined length in the axial direction of the space 20. The valve head guide member 28 has a central hole defined therein in which there is threaded a closure member 36 closing a back pressure chamber 36, to be described later, with an O-ring 38 interposed between the valve head guide member 28 and the closure member 36. The closure member 36 has a recess 40 having a rectangular cross-sectional shape which is defined in an end thereof. The recess 40 serves to receive a tool or the like, not shown, for threading the closure member 36 into the central hole in the valve head guide member 28 from outside of the regulator 10.

The valve head guide member 28 and the first block 18a are formed separately independently of each other, and can easily be assembled together by the bolt 30. Since the valve head guide member 28 and the first block 18a are formed as separate members, a fluororesin coating can be applied to the valve head guide member 28 without affecting the material and surface treatment of the body 16 (the first block 18a). If the valve head guide member 28 and the first block 18a were integrally formed and a fluororesin coating were applied to the integral assembly, then when the integral assembly is baked, an alumite film applied to the surface of the first block 18a of the body 16 would be broken.

As the substantially central hole is defined in the valve head guide member 28 and subsequently closed by the closure member 36, a fluororesin coating can easily be applied by spraying to an inner wall surface of the guide sleeve 32 of the valve head guide member 28. The fluororesin coating thus applied is uniform and stable. After the fluororesin coating is applied by spraying to the inner wall surface of the guide sleeve 32, the closure member 36 can easily be mounted in the hole in the valve head guide member 28.

The valve mechanism 24 includes a rod 42 extending in the axial direction of the body 16 and a guide member 46 fitted over the rod 42 and having an integral valve head 44 projecting radially outwardly.

The valve mechanism 24 also has a large-diameter first diaphragm 50 coupled to an end of the rod 42 by a first retaining mechanism 48 and a small-diameter second diaphragm 54 disposed between the first diaphragm 50 and the valve head 44 and coupled to the rod 42 by a second retaining mechanism 52.

The first diaphragm 50 and the second diaphragm 54 have respective pressure-bearing areas whose ratio is set to a value in the range from about 2:1 to about 4:1 for the reasons described above. Preferably, the ratio of the pressure-bearing areas of the first diaphragm 50 and the second diaphragm 54 is set to about 3:1 for regulating the pressure of hydrogen (secondary pressure) delivered from the secondary port 14 to a value that is three times the air pressure as the pilot pressure, thereby to keep desired circulation pressure and suction characteristics of the ejector 226 connected to the secondary port 14 and used in the present embodiment, and to maximize the performance of the ejector 226.

The rod 42 has an integral stopper 58 formed on an intermediate portion thereof and comprising four fingers bent into an L-shaped cross section and angularly spaced at angular intervals of about 90 degrees in the circumferential direction. The stopper 58 serves as part of the second retaining mechanism 52.

The guide member 46 comprises an elongate hollow cylinder having a first communication hole 62 which communicates with a hollow region 60 defined in the guide member 46. The valve head 44 which projects a predetermined length radially outwardly is integrally formed with an end of the hollow cylinder of the guide member 46. The guide member 46 has an elongate portion extending below the valve head 44 and performing a guiding function for preventing the valve head 44 from being inclined when the valve head 44 is seated on a valve seat 64.

The guide member 46 is of a reduced weight as it has the hollow region 60 and the first communication hole 62, and hence suffers reduced self-excited oscillations and is subject to reduced sliding resistance. The portion of the guide member 46 which performs its guiding function and the guide sleeve 32 are coated with a fluororesin coating to achieve good slidability in a sliding region of the guide member 46 and the guide sleeve 32 for increased durability. An annular rubber member 68 is applied to the area of the valve head 44 which is to be seated on the valve seat 64.

An O-ring 70 is mounted in an annular groove defined in the outer circumferential surface of the guide member 46 near the valve head 44, and a Y-gasket 72 is mounted in an annular groove defined in the outer circumferential surface of the guide member 46 at a position spaced from the O-ring 70 remotely from the valve head 44. The O-ring 70 and the Y-gasket 72 which are held in contact with the guide sleeve 32 for performing a sealing function are spaced a predetermined distance from each other for providing a desired sliding resistance to suppress self-excited oscillations.

When the guide member 46 is displaced along the guide sleeve 32 as the O-ring 70 and the Y-gasket 72 slide against the latter, the guide member 46 is linearly guided while being displaced in unison with the rod 42, allowing the valve head 44 to be seated on the valve seat 64 without being inclined with respect to the valve seat 64.

The Y-gasket 72 mounted on the guide member 46 remotely from the valve head 44 poses a sliding resistance that is slightly smaller than if the Y-gasket 72 were replaced with an O-ring. The O-ring 70 disposed closely to the valve head 44 and the Y-gasket 72 disposed remotely from the valve head 44 jointly provide a desired sliding resistance. The desired sliding resistance may also be achieved by using a sliding member, e.g., a bearing or the like, not shown, instead of the Y-gasket 72. The guide sleeve 32 may have a hole, not shown, and the O-ring 70 may be replaced with a sliding member such as a bearing or the like. In such a modification, the Y-gasket 72 may be replaced with an O-ring.

The guide member 46 has an annular recess defined in the outer circumferential surface thereof between the O-ring 70 and the Y-gasket 72, providing an annular space 74 between the guide member 46 and the guide sleeve 32. The annular space 74 is held in communication with the axially extending first communication hole 62 through a hole 76 defined in the guide member 46 substantially perpendicularly to the first communication hole 62.

The annular space 74 defined between the O-ring 70 and the Y-gasket 72 which are spaced a predetermined distance from each other and communicating with the first communication hole 62 develops a negative pressure between the O-ring 70 and the Y-gasket 72, preventing the O-ring 70 and the Y-gasket 72 from sticking to the inner wall surface of the guide sleeve 32 (from being attracted thereto by a sealing action). Therefore, the guide member 46 is given desired slidability with respect to the guide sleeve 32 of the valve head guide member 28. The present invention is not limited to the hole 76 defined in communication with the first communication hole 62, but a hole, not shown, may be defined in the guide sleeve 32 of the valve head guide member 28 to prevent a sealed state from being developed between the O-ring 70 and the Y-gasket 72.

The back pressure chamber 34 that is surrounded by the guide sleeve 32 and the closure member 36 is defined in the end of the guide member 46 whose outer circumferential surface is sealed by the O-ring 70 and the Y-gasket 72. The back pressure chamber 34 is effective to reduce the pressure imposed on the valve head 44 for improved pressure vs. flow rate characteristics. Stated otherwise, the force tending to urge the valve head 44 in a direction away from the valve seat 64 under a regulated secondary pressure and the force tending to urge the valve head 44 in a directed to be seated on the valve seat 64 with a fluid under pressure introduced into the back pressure chamber 34 cancel each other, thus reducing the pressure imposed on the valve head 44.

The back pressure chamber 34 is held in communication with an aspirator chamber 80, to be described later, through the first communication hole 62 which extends a predetermined length axially in the rod 42, and a second communication hole 78 crossing the first communication hole 62 substantially perpendicularly thereto.

A coiled first spring 56 is disposed around the guide member 46 and has an end engaging the valve head 44 and the other end engaging in an annular recess defined in the body valve guide member 28. The valve head 44 is normally biased to be seated on the valve seat 64 under the spring force of the first spring 56. The spring force of the first spring 56 is set to a value greater than the spring force of a coiled second spring 84 which is disposed in a pilot chamber 82, to be described later.

Since the spring force of the first spring 56 overcomes the spring force of the second spring 82 which normally urges the valve head 44 in a direction away from the valve seat 64, the valve mechanism is of the normally closed type in which the valve head 44 is seated on the valve seat 64 in a normal condition where no pilot pressure is applied. Since the valve mechanism is of the normally closed type, hydrogen is not delivered from the secondary port 14 when unnecessary, and hence is prevented from being wasted for saving power.

The first spring 56 which functions as a return spring may possibly affect the pressure ratio 1:3 between air and hydrogen. In view of such a concern, the ratio of the pressure-bearing areas of the large-diameter first diaphragm 50 and the small-diameter second diaphragm 54 should be set to a value in the range from 3.1:1 to 3.2:1, most preferably be set to 3.16:1. If the ratio of the pressure-bearing areas of the first diaphragm 50 and the second diaphragm 54 is set to the ratio 3.16:1 which has been determined on experimental data, then a reduction in the pressure of hydrogen due to the resistive force of the first spring 56 is corrected, keeping an appropriate pressure ratio between air and hydrogen.

A valve seat member 66 which includes the valve seat 64 for seating thereon the valve head 44 of the guide member 46 is disposed on an inner wall surface of the first block 18a, and an O-ring 86 having a sealing function is disposed between the valve seat member 66 and the inner wall surface of the first block 18a. The valve seat member 66 is crimped in place on an annular ridge formed on the first block 18a. The valve seat member 66 has a tapered surface 88 progressively spreading in a direction away from the valve head 44 and surrounding the rod 42 out of contact therewith.

A space between the outer circumferential surface of the rod 42 and the tapered surface 88 of the valve seat member 66 functions as the fluid passage 22. The fluid passage 22 has its cross-sectional area progressively increased by the tapered surface 88 which progressively spreads upwardly away from the valve seat 64, and hence is free of abrupt cross-sectional area changes and is capable of suppressing self-excited oscillations.

An aspirator holder 90 having a through hole through which the rod 42 extends is screwed to a step formed in an upper portion of the first block 18a. The aspirator chamber 80 is defined between the aspirator holder 90 and the second diaphragm 54. To the aspirator holder 90, there is connected a nozzle 94 communicating with the aspirator chamber 80 and having a suction hole 92 directed toward the secondary port 14.

The fluid passage 22 which is progressively enlarged toward the secondary port 14 is defined between a slanted surface of the aspirator holder 90 and the tapered surface 88 of the valve seat 66. Therefore, the fluid passage 22 is free of abrupt cross-sectional area changes and is capable of suppressing self-excited oscillations.

An O-ring 98 is mounted in an annular groove defined in the outer circumferential surface of the rod 42, and held in contact with the surface of the through hole in the aspirator holder 90 to provide a sealing function to keep the aspirator chamber 80 hermetically sealed. The aspirator chamber 80 is held in communication with the first communication hole 62 which extends axially through the rod 42 and the back pressure chamber 34 near the guide member 46 through the second communication hole 78 extending perpendicularly to the axis of the rod 42.

The retaining mechanism 48 comprises a first upper retainer 100 held against an upper surface of the first diaphragm 50 and a first lower retainer 102 held against a lower surface of the first diaphragm 50. The first upper and lower retainers 100, 102 are mounted on the rod 42 at their respective central holes. The first diaphragm 50 has an outer circumferential edge portion which is not retained by the first upper and lower retainers 100, 102, but sandwiched between the second block 18b and the third block 18c.

The second retaining mechanism 52 comprises a second upper retainer 104 held against an upper surface of the second diaphragm 54 and a second lower retainer 106 held against a lower surface of the second diaphragm 54. Only the second upper retainer 104 is mounted on the rod 42, and the second lower retainer 106 is integrally formed with the rod 42. The second diaphragm 54 has an outer circumferential edge portion which is not retained by the second upper and lower retainers 104, 106, but sandwiched between the first block 18a and the second block 18b.

After the second upper retainer 104, the first lower retainer 102, and the first upper retainer 100 are successively stacked on the second lower retainer 106 that is integrally formed with the rod 42, they are fastened to the rod 42 by a wave washer 110 and a nut 112.

The stopper 58 which is bent downwardly into an L-shaped cross section is formed on the outer circumferential edge of the second lower retainer 106. The stopper 58 comprises four fingers angularly spaced at angular intervals of about 90 degrees in the circumferential direction. When the first diaphragm 50, the second diaphragm 54, and the rod 42 are displaced downwardly in unison with each other under a pilot pressure supplied to the pilot chamber 82, the stopper 58 abuts against an upper surface of the aspirator holder 90, limiting the displacement of the rod 42 thereby to perform its stopping function.

An atmospheric chamber 114 that is closed by an inner wall surface of the second block 18b is defined between the first diaphragm 50 and the second diaphragm 54, and is held in communication with the atmosphere through a passage, not shown. An annular recess 118 for allowing a bent outer circumferential edge 116 of the first lower retainer 102 to enter therein is defined in the inner wall surface of the second block 18b. The dimension of a region where the bent outer circumferential edge 116 enters the annular recess 118 is thus reduced, making smaller the axial size of the regulator.

The pilot chamber 82 is defined above the first diaphragm 50 and surrounded by an inner wall surface of the third block 18c. The pilot chamber 82 is supplied with a pilot pressure through a pilot port, not shown. The pilot chambre 82 is closed by a large-diameter first adjustment screw (first adjustment member) 122 which is threaded into an internally threaded hole in the third block 18c with an O-ring 120 interposed therebetween, and a small-diameter second adjustment screw (second adjustment member) 126 which is threaded into an internally threaded hole that is defined centrally in the first adjustment screw 122.

The first adjustment screw 122 has an adjustment knob 128 having a hexagonal cross-sectional shape, and the second adjustment screw 126 has an adjustment cavity 130 having a hexagonal cross-sectional shape.

The second spring 84 is disposed in the pilot chamber 82, and has an end engaging a spring retainer 132 and the other end engaging a leaf spring 134 which is to be described later. The first adjustment screw 122 can make coarse adjustment of the spring force of the second spring 84, and the second adjustment screw 126 can make fine adjustment of the spring force of the second spring 84.

By thus adjusting the spring force of the second spring 84 in two stages with the first and second adjustment screws 122, 126, the spring force of the second spring 84 can be adjusted in a large adjustment range, providing a good spring load capability with small spring load changes.

A cylindrical bushing 136 of stainless steel is mounted on the inner wall surface of the third block 18c which defines the pilot chamber 82. The leaf spring 134 is held in frictional contact with an inner circumferential surface of the bushing 136 for imparting sliding resistance to the first diaphragm 50.

The leaf spring 134 comprise an annular portion 134a mounted on an annular land of the first upper retainer 100, a plurality of legs 134b raised upwardly perpendicularly to the annular portion 134a and angularly spaced at predetermined intervals in the circumferential direction, and a plurality of curved portions 134c disposed respectively on the distal ends of the legs 134b. The leaf spring 134 is coated with a diamond-like carbon coating or the like to provide an appropriate contact resistance between the bushing 136 and the curved portions 134c for a desired sliding resistance.

Since the bushing 136 of stainless steel is mounted on the inner wall surface of the third block 18c and has its inner circumferential surface held in contact with the curved portions 134c of the leaf spring 134, the inner circumferential surface of the bushing 136 is protected for increased durability.

Operation and advantages of the regulator 10 for fuel cells according to the present invention will be described below.

In the present embodiment, the spring force of the first spring 56 disposed below the valve head 44 is set to a value greater than the spring force of the second spring 84 which is disposed in the pilot chamber 82 above the valve head 44. Therefore, the valve mechanism is closed with the valve head 44 seated on the valve seat 64 in a normal condition where no pilot pressure is applied to the pilot chamber 82.

Consequently, according to the present embodiment, no hydrogen needs to be delivered from the secondary port 14 when unnecessary unlike a normally open regulator where the valve head 44 is spaced a predetermined distance from the valve seat 64 in a normal condition. As a result, according to the present embodiment, hydrogen as a fuel is prevented from being wasted for saving power.

When the oxidizing agent supply 204 is actuated in response to a movement of an accelerator pedal or the like, pilot air is introduced through the bypass passage 232 and a pilot port, not shown, into the pilot chamber 82. The pilot air introduced into the pilot chamber 82 acts to press the first diaphragm 50 downwardly. The first diaphragm 50, the second diaphragm 54, and the valve head 44 which are coupled together by the rod 42 are displaced downwardly in unison with each other, and the valve head 44 is spaced from the valve seat 64. At this time, the stopper 58 integral with the rod 42 abuts against a flat upper surface of the aspirator holder 90, limiting the displacement of the rod 42.

When hydrogen supplied from the primary port 12 passes through the gap between the valve head 44 and the valve seat 64, the pressure thereof is reduced to a desired pressure corresponding to the pilot pressure. The pressure-regulated hydrogen then passes through the fluid passage 22, and is thereafter discharged from the secondary port 14 to the ejector 226.

Inasmuch as the ratio of the pressure-bearing area of the first diaphragm 50 on which the pilot pressure acts and the pressure-bearing area of the second diaphragm 54 on which hydrogen introduced into the aspirator chamber 80 is set to a value in the range from about 2:1 to about 4:1, most preferably set to 3.16:1, the pressure of the hydrogen discharged from the secondary port 14 can be set to a value which is three times the air pressure as the pilot pressure. Therefore, the ejector 226 connected to the secondary port 14 can keep desired circulation pressure and suction characteristics, and have its performance maximized.

According to the present embodiment, the regulator 10 has two diaphragms, i.e., the first diaphragm 50 which flexes under the pressure of air supplied as the pilot pressure and the second diaphragm 54 which flexes under the pressure of hydrogen flowing through the fluid passage 22, with the atmospheric chamber 114 defined between the first diaphragm 50 and the second diaphragm 54. Therefore, even when either the first diaphragm 50 or the second diaphragm 54 has its durability degraded, the air and the hydrogen are prevented from being mixed with each other. Even if air or hydrogen finds its way into the atmospheric chamber 114, it can be discharged into the atmosphere through the non-illustrated passage.

According to the present embodiment, when the hydrogen discharged from the secondary port 14 is increased in quantity, the pressure in the aspirator chamber 80 becomes lower than the pressure (secondary pressure) discharged from the secondary port 14 due to a suction that occurs through the suction hole 92 of the nozzle 94 that is directed toward the secondary port 14. Since the back pressure chamber 34 and the aspirator chamber 80 are held in communication with each other through the hollow region 60, the first communication hole 62, and the second communication hole 78 that are defined in the rod 42, the pressure in the back pressure chamber 34 is equalized with the pressure the aspirator chamber 80, and becomes lower than the secondary pressure discharged the secondary port 14. According to the present embodiment, therefore, the pressure in the back pressure chamber 34 may be lower than would be if the back pressure chamber 34 and the fluid passage 22 connected to the secondary port 14 communicated with each other.

Figure 4:
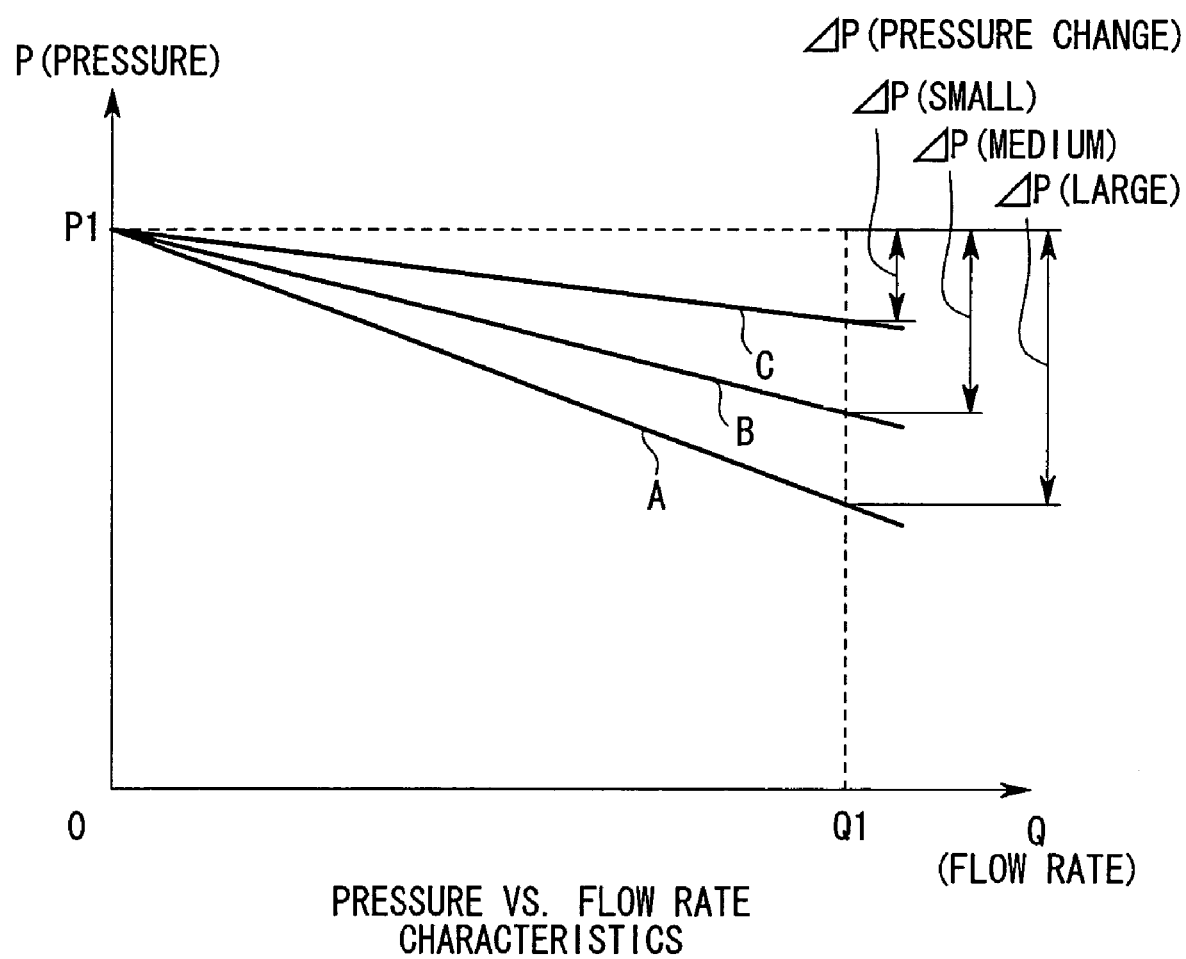
FIG. 4 is a graph showing pressure vs. flow rate characteristics which represent the magnitudes of pressure changes when a flow rate is changed, and the fluid is supplied to the regulator at a constant pressure.

Pressure vs. flow rate characteristics when the flow rate Q of a fluid under pressure is changed under a constant pressure P1 are shown in FIG. 4. In FIG. 4, a linear characteristic curve A represents pressure vs. flow rate characteristics plotted when only the back pressure chamber 34 is provided. A linear characteristic curve B represents pressure vs. flow rate characteristics plotted when the back pressure chamber 34 communicates with the fluid passage 22 connected to the secondary port 14. A linear characteristic curve C represents pressure vs. flow rate characteristics plotted when the back pressure chamber 34 communicates with the aspirator chamber 80.

As can be understood from FIG. 4, a pressure change ΔP that is caused when the flow rate Q of the fluid under pressure is increased to a flow rate Q1 under the constant pressure P1 is the greatest for the linear characteristic curve A that is plotted when only the back pressure chamber 34 is provided. The pressure change ΔP for the linear characteristic curve B that is plotted when the back pressure chamber 34 communicates with the fluid passage 22 connected to the secondary port 14 is smaller than the pressure change ΔP for the linear characteristic curve A. The pressure change ΔP for the linear characteristic curve C that is plotted when the back pressure chamber 34 communicates with the aspirator chamber 80 is the smallest, i.e., smaller than the pressure changes ΔP for the linear characteristic curves A, B.

According to the present embodiment, therefore, since the back pressure chamber 34 and the aspirator chamber 80 are held in communication with each other through the hollow region 60, the first communication hole 62, and the second communication hole 78 that are defined in the rod 42, the pressure change ΔP is prevented from unduly increasing even when the flow rate of the fluid under pressure increases, thus minimizing a pressure loss. As a result, the regulator according to the present embodiment provides good pressure vs. flow rate characteristics.

What is claimed is:

1. A regulator for use with fuel cells, comprising:
   a body having a primary port for being supplied with a fuel gas and a secondary port for discharging the fuel gas;
   a valve head displaceably disposed in said body for being unseated from and seated on a valve seat for opening and closing a fluid passage which interconnects said primary port and said secondary port;
   a first diaphragm and a second diaphragm which are disposed in said body and spaced a predetermined distance from each other, said first diaphragm being flexible under the pressure of pilot air as an oxidizing agent supplied to a pilot chamber, said second diaphragm being flexible under the pressure of the fuel gas flowing through said fluid passage;
   a rod for displacing said valve head, said first diaphragm, and said second diaphragm in unison with each other upon flexing of said first and second diaphragms;
   a first spring engaging said valve head for normally urging said valve head in a direction to be seated on said valve seat; and
   a second spring disposed in said pilot chamber for normally urging said valve head in a direction to move away from said valve seat;
   wherein the spring force of said first spring is set to a value greater than the spring force of said second spring, and said valve head is seated on said valve seat when the pilot air is not supplied to said pilot chamber.

2. A regulator for fuel cells according to claim 1, wherein the ratio of pressure-bearing areas of said first diaphragm and said second diaphragm is set to a value in the range from about 2:1 to about 4:1.

3. A regulator for fuel cells according to claim 2, wherein the ratio of the pressure-bearing areas of said first diaphragm and said second diaphragm is set to a value in the range from 3.1:1 to 3.2:1 by being corrected by the spring force of said first spring for normally urging said valve head toward said valve seat.

4. A regulator for fuel cells according to claim 1, further comprising a back pressure chamber defined at an end of said rod for acting in a direction to cancel out a pressure applied to said valve head, and an aspirator chamber defined between said second diaphragm and said valve head for developing a pressure lower than a pressure in said secondary port due to a suction caused by a nozzle, said rod having a communication hole defined therein which provides fluid communication between said back pressure chamber and said aspirator chamber.

5. A regulator for fuel cells according to claim 1, further comprising a valve seat member which has said valve seat, said valve seat member having a tapered surface providing a fluid passage cross section which progressively spreads along the fluid passage communicating with said secondary port.

6. A regulator for fuel cells according to claim 5, further comprising an aspirator holder, said aspirator holder and said second diaphragm defining an aspirator chamber therebetween, said aspirator holder having a slanted surface, said fluid passage cross section being provided so as to progressively spread between said slanted surface of said aspirator holder and said tapered surface of the valve seat member.

7. A regulator for fuel cells according to claim 1, wherein said valve head is mounted on a guide member connected to an end of said rod, said valve head being guided by a valve head guide member having a guide sleeve which surrounds an outer circumferential surface of the guide member except for said valve head.

8. A regulator for fuel cells according to claim 7, wherein a fluororesin coating is applied to a sliding region of the outer circumferential surface of the guide member and the guide sleeve.

9. A regulator for fuel cells according to claim 7, wherein a pair of sealing members spaced a predetermined distance from each other axially of the guide member which is cylindrical is disposed between said guide member and said guide sleeve.

10. A regulator for fuel cells according to claim 9, wherein said pair of sealing members comprises an O-ring disposed closely to said valve heat and a Y-gasket disposed remotely from said valve seat.

11. A regulator for fuel cells according to claim 9, wherein an annular space communicating with a communication hole extending axially of said rod is defined between said sealing members.

12. A regulator for fuel cells according to claim 7, wherein said valve head guide member is separate from said body.

13. A regulator for fuel cells according to claim 12, wherein said valve head guide member has a hole defined centrally therein which is contiguous to said guide sleeve, said hole being closed by a removable closure member.

14. A regulator for fuel cells according to claim 1, further comprising a leaf spring disposed in said pilot chamber for applying a sliding resistance to said first diaphragm, said leaf spring having a leg with a curved portion held in contact with a cylindrical bushing of stainless steel which is mounted in said body.

15. A regulator for fuel cells according to claim 14, wherein said leaf spring has an outer surface coated with at least a diamond-like carbon coating.

16. A regulator for fuel cells according to claim 1, further comprising a first adjustment member and a second adjustment member for adjusting in two stages the spring force of the second spring disposed in said pilot chamber.

17. A regulator for fuel cells according to claim 1, further comprising an upper retainer and a lower retainer which are connected to said rod and hold face and reverse sides, respectively, of said first diaphragm, said body having an annular recess defined in an inner wall surface of said body for allowing a bent outer circumferential edge of said lower retainer to enter therein.

18. A regulator for fuel cells according to claim 16, wherein said first adjustment member comprises a first adjustment screw threaded in a threaded hole defined in an end of said body, and said second adjustment member comprises a second adjustment screw threaded in a threaded hole defined centrally in said first adjustment screw.

19. A regulator for fuel cells according to claim 1, wherein said regulator is incorporated in a fuel cell system having a fuel cell stack having an anode and a cathode;

said regulator being mounted in a pressure controller disposed between a fuel supply for supplying a fuel to said anode and said anode;

said pressure controller being responsive to the pressure of air supplied as a pilot pressure through a bypass passage, for discharging a pressure to the secondary port which has been regulated depending on said pilot pressure.

20. A regulator for fuel cells according to claim 19, wherein said fuel cell system is mounted on an automobile.

* * * * *